United States Patent
Dantlgraber

(10) Patent No.: US 7,003,953 B2
(45) Date of Patent: Feb. 28, 2006

(54) DRIVE DEVICE, PARTICULARLY FOR THE CLOSING UNIT, THE INJECTION UNIT OR THE EJECTORS OF A PLASTIC INJECTION MOLDING MACHINE

(75) Inventor: Jörg Dantlgraber, Lohr (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 10/495,816

(22) PCT Filed: Nov. 14, 2002

(86) PCT No.: PCT/EP02/12752

§ 371 (c)(1),
(2), (4) Date: May 14, 2004

(87) PCT Pub. No.: WO03/043797

PCT Pub. Date: May 30, 2003

(65) Prior Publication Data

US 2005/0005602 A1    Jan. 13, 2005

(30) Foreign Application Priority Data

Nov. 22, 2001 (DE) ............................... 101 57 373

(51) Int. Cl.
*F15B 7/00* (2006.01)
(52) U.S. Cl. .......................................... 60/565; 60/570
(58) Field of Classification Search .................. 60/545, 60/565, 570, 588, 592
See application file for complete search history.

(56) References Cited

U.S. PATENT DOCUMENTS

| | | | |
|---|---|---|---|
| 2,473,803 A * | 6/1949 | La Brie | ........................ 60/588 |
| 4,030,299 A | 6/1977 | Reuschel et al. | |
| 4,499,728 A * | 2/1985 | Therond | ........................ 60/570 |
| 5,261,810 A * | 11/1993 | Kamp et al. | .............. 425/451.9 |
| 5,345,766 A * | 9/1994 | Leonhartsberger et al. | ... 60/545 |
| 6,439,875 B1 * | 8/2002 | Morita et al. | ................ 425/556 |

FOREIGN PATENT DOCUMENTS

| | | |
|---|---|---|
| DE | 4111594 | 10/1992 |
| WO | 9211993 | 7/1992 |
| WO | 0189801 | 11/2001 |
| WO | 02096617 | 12/2002 |

OTHER PUBLICATIONS

Patent Abstracts of Japan vol. 018, No. 636 (M-1715) Dec. 5, 1994 -& JP 06 246805 A (Meiki Co. LTD), Sep. 6, 1994.
Patent Abstracts of Japan vol. 2000, No. 15. Apr. 6, 2001 -& JP 2000 334799 A (Mitsubishi Heavy IND LTD) Dec. 5, 2000.

* cited by examiner

*Primary Examiner*—Edward K. Look
*Assistant Examiner*—Michael Leslie
(74) *Attorney, Agent, or Firm*—Martin A. Farber

(57) ABSTRACT

A drive device for closing unit, injection unit or ejectors of a plastics injection molding machine, has a drive element which is axially moveable, and a hydraulic unit which is moveable by the drive element in the same direction as the drive element. The hydraulic unit is a force multiplier with a large piston and a first small piston, which are moveable in relation to one another and differ in size of their effective surface areas. An intermediate part together with the pistons encloses a pressure chamber filled with a pressure fluid. The first small piston is mechanically connected to the drive element. A second small piston with the intermediate part define a fluid chamber connected by a valve, in one embodiment, to the pressure chamber. The hydraulic unit as a whole is moveable for the positioning movement and the intermediate part is blockable against displacement in relation to a fixed frame.

14 Claims, 4 Drawing Sheets

DRIVE DEVICE, PARTICULARLY FOR THE CLOSING UNIT, THE INJECTION UNIT OR THE EJECTORS OF A PLASTIC INJECTION MOLDING MACHINE

FIELD AND BACKGROUND OF THE INVENTION

The invention relates to a drive device, which is to be used in particular for the closing unit or the injection unit or the ejectors of a plastics injection molding machine, with a drive element (10) which is axially moveable by an electric motor and with a hydraulic unit (12) which, by moving the drive element (10), is moveable in same direction as the latter.

Within the closing unit of a plastics injection molding machine, the drive device moves the movable platen of the machine. Such a drive device has to meet two different important requirements. On the one hand, it is to move the platen as quickly as possible for closing and opening the mold, in order to keep down the cycle time for producing a molding. On the other hand, it is to be capable of keeping the platen, and consequently the entire mold, closed with great force against the high injection pressure. Therefore, on the one hand positioning movements are to be performed at high speed, on the other hand great forces are to be exerted without significant movement. Such requirements may arise not only in the case of the closing unit but also in the case of the ejectors or the injection unit of a plastics injection molding machine. For example, during the injection of polymer into the mold, the placticizing screw is moved at relatively high speed in the direction of the mold, until the mold is completely filled with polymer. If, following this, the polymer melt located in the mold is subjected to a so-called holding pressure, the drive must provide a great force without significant movement of the plasticizing screw.

U.S. Pat. No. 4,030,299 discloses a purely hydraulic drive for the movable platen of a plastics injection molding machine which also includes a hydraulic force multiplier. This has a movable piston of a small effective surface area, a further movable piston of a large effective surface area and a cylinder, which together with the pistons encloses a pressure chamber filled with a pressure fluid. The cylinder is fixedly arranged on the frame of the injection molding machine. The drive also includes hydraulic cylinders, which move the movable platen for closing and opening the mold. In the opened state of the mold, the volume of the pressure chamber of the hydraulic force multiplier is minimal. If the movable platen is then moved by the hydraulic cylinders in the sense of closing the mold, the large piston of the hydraulic force multiplier is taken along, with the volume of the pressure chamber of the hydraulic force multiplier increasing and pressure medium flowing out of a tank into the pressure chamber via a replenishing valve. Following this, the small piston of the hydraulic force multiplier is moved into the pressure chamber and thereby produces a high pressure, which brings about a great closing force by acting via the large effective surface area of the large piston. The small piston is hydraulically moved by supplying pressure fluid. Consequently, in the case of the drive device according to U.S. Pat. No. 4,030,299, various hydraulic drive components are present for the positioning movement of the movable platen and for the exertion of a great force. During the positioning movements of the platen, considerable pressure fluid flows back and forth between the pressure chamber and the tank, which necessitates correspondingly large valves and fluid channels.

A drive device with the features of the introductory paragraph is known from DE 41 11 594 A1. In the case of this drive device, a hydraulic cylinder with a large effective surface area is fixedly connected to the movable platen. The unit comprising the movable platen and the hydraulic cylinder can be moved by an electric motor via a gear mechanism, which comprises a lifting spindle and a spindle nut, to obtain rapid closing and opening of the mold. The great closing force is provided by pressure exertion of the hydraulic cylinder which can be moved with the platen. In this case, the entire force of reaction is diverted via the spindle and the spindle nut to the machine frame. Apart from the components of the electric drive, the plastics injection molding machine according to DE 41 11 594 A1 is also equipped with a complete hydraulic system, including an oil tank, pump, valves and hydraulic cylinders.

SUMMARY OF THE INVENTION

The invention is based on the object of further developing a drive device which has the features of the introductory paragraph in such a way that on the one hand a rapid positioning movement is possible and on the other hand a large force effect can be achieved, with low expenditure.

The set object is achieved by the drive device having the features of the introductory paragraph, also having the features according to the invention, wherein such a drive device uses a hydraulic force multiplier in which, disregarding changes in volume caused by a pressure change, a specific volume of pressure fluid is enclosed in its pressure chamber at least during the positioning movement and the subsequent exertion of a great force. Other hydraulic components are not necessary in principle for a drive device according to the invention. According to the invention, the small piston of the hydraulic force multiplier is mechanically connected to the drive element which can be axially moved by the electric motor. Furthermore, according to the invention, the hydraulic unit as a whole can be moved for the positioning movement of an element to be driven, whereby the speed of the large piston mechanically coupled to the element to be driven is equal to the high speed of the drive element moved axially by the electric motor. To be able to exert a great force, the intermediate part of the hydraulic force multiplier is blocked against displacement in relation to a fixed frame by a blocking device, so that further movement of the small piston by relatively small displacement in the pressure chamber of the force multiplier can have the effect of building up a high pressure, which produces a great force at the large effective surface area of the large piston. In this case, only a proportion of the force corresponding to the effective surface area of the small piston has to be supported by the drive element.

According to a feature of the invention, the blocking device is preferably formed as a magnetic-particle clutch.

In a particularly advantageous way, the hydraulic unit has a second small piston and, arranged between a fluid chamber, which is adjoined by the second small piston, and the pressure chamber is a valve, via which pressure fluid can be forced into the pressure chamber and by which the fluid chamber can be shut off with respect to the pressure chamber. For building up the pressure in the pressure chamber, the pressure chamber is reduced in size by the first small piston and, in addition, pressure fluid is forced out of the fluid chamber into the pressure chamber by the second small piston in a first phase. With the displacement of the drive element, the pressure in said pressure chamber increases rapidly. Dependent on the displacement of the small pistons, but preferably dependent on the pressure reached in the pressure chamber, the forced displacement of pressure fluid out of the fluid chamber into the pressure chamber is ended and the valve closes for the second phase of the pressure build-up. The further pressure build-up is brought about solely by the displacement of the first small piston. As a result, the force to be exerted via the drive element remains limited. According to a feature of the invention, the valve is preferably a non-return valve, which opens toward the pressure chamber. The second small piston may be larger, than the first small piston.

Further advantageous refinements of a drive device according to the invention are described further herein.

In just the same way as the first small piston, the second small piston can be taken along by the drive element during the positioning movement and during the first phase of the pressure build-up. According to a feature of the invention, the second small piston can be taken along by the drive element by means of a releasable coupling device. For the second phase of the pressure build-up, this coupling can be released, so that the second small piston remains substantially at rest in this phase. In particular, it may be provided that the drive unit takes the second small piston along by means of a biased spring arrangement, the biasing of which is no longer adequate for transmitting a movement from the drive element to the second small piston when there is a specific pressure in the fluid chamber. The pressure in the fluid chamber then increases in the second phase only in a way corresponding to the spring characteristic.

According to another feature of the invention, the fluid chamber at the second small piston can be connected via a second valve to a storage chamber for pressure fluid, it being possible after opening of the second valve for pressure fluid to be forced out of the pressure subchamber into the storage chamber by the second small piston, taken along further by the drive element engaged in the force build-up movement. The second small piston may in this case be coupled fixedly or via a biased spring arrangement to the drive element, the latter permitting alignment errors between the drive element and the piston to be compensated in a simple way. According to still another feature of the invention, the second valve is preferably controlled by the pressure in the fluid chamber, which acts on the control part of the valve in the opening direction against the force of an energy store, which is realized in particular by a spring. Arranged parallel to the second valve, between the fluid chamber and the storage chamber, is a non-return valve which opens toward the fluid chamber and via which pressure fluid can flow out of the storage chamber into the fluid chamber during the movement of the drive element bringing about the pressure reduction and the associated increase in size of the fluid chamber. According to a feature of the invention, the pressure chamber can be connected to the storage chamber toward the end of the pressure reducing movement, with the amount of pressure fluid that was displaced out of the fluid chamber into the pressure chamber during the first phase of the pressure build-up passing into the storage chamber. According to another feature of the invention, the connection is preferably established by means of a control edge on the first small piston.

According to still a further feature of the invention, on the side of the second small piston opposite from the fluid chamber there is a second fluid chamber, in which pressure fluid can be confined, so that the hydraulic unit can be taken along by the drive element on its return by means of the confined pressure fluid.

In the configuration regarded as particularly advantageous according to a feature of the invention, the second fluid chamber is, furthermore, also used as a pump working chamber, which can be connected via an inlet valve to the storage chamber and via an outlet valve to a high-pressure accumulator. From the high-pressure accumulator, a hydraulically operable blocking device for the intermediate part of the hydraulic unit can be supplied in particular with pressure fluid. For this purpose, according to a feature of the invention, a working chamber of the blocking device is connected to the high-pressure accumulator in one position of a valve and is connected to the storage chamber in another position of this valve.

DETAILED DESCRIPTION OF THE PREFERRED EMBODIMENT

Figure 1:
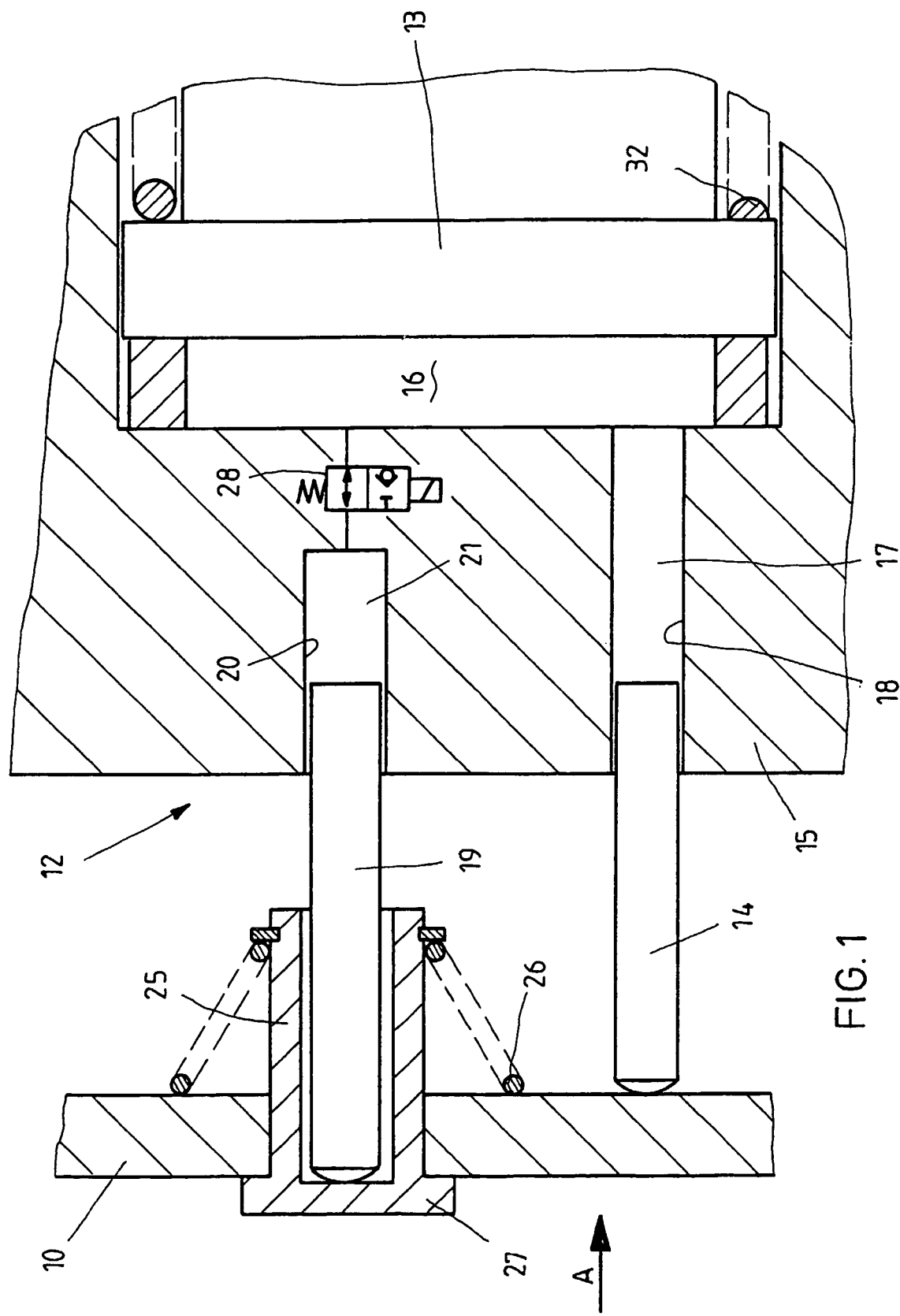
FIG. 1 shows a first exemplary embodiment in which, apart from the first small piston, there is a second small piston, which contributes to the pressure build-up in the pressure chamber only until a specific pressure is reached, and only until then is taken along by the drive element.
Figure 2:
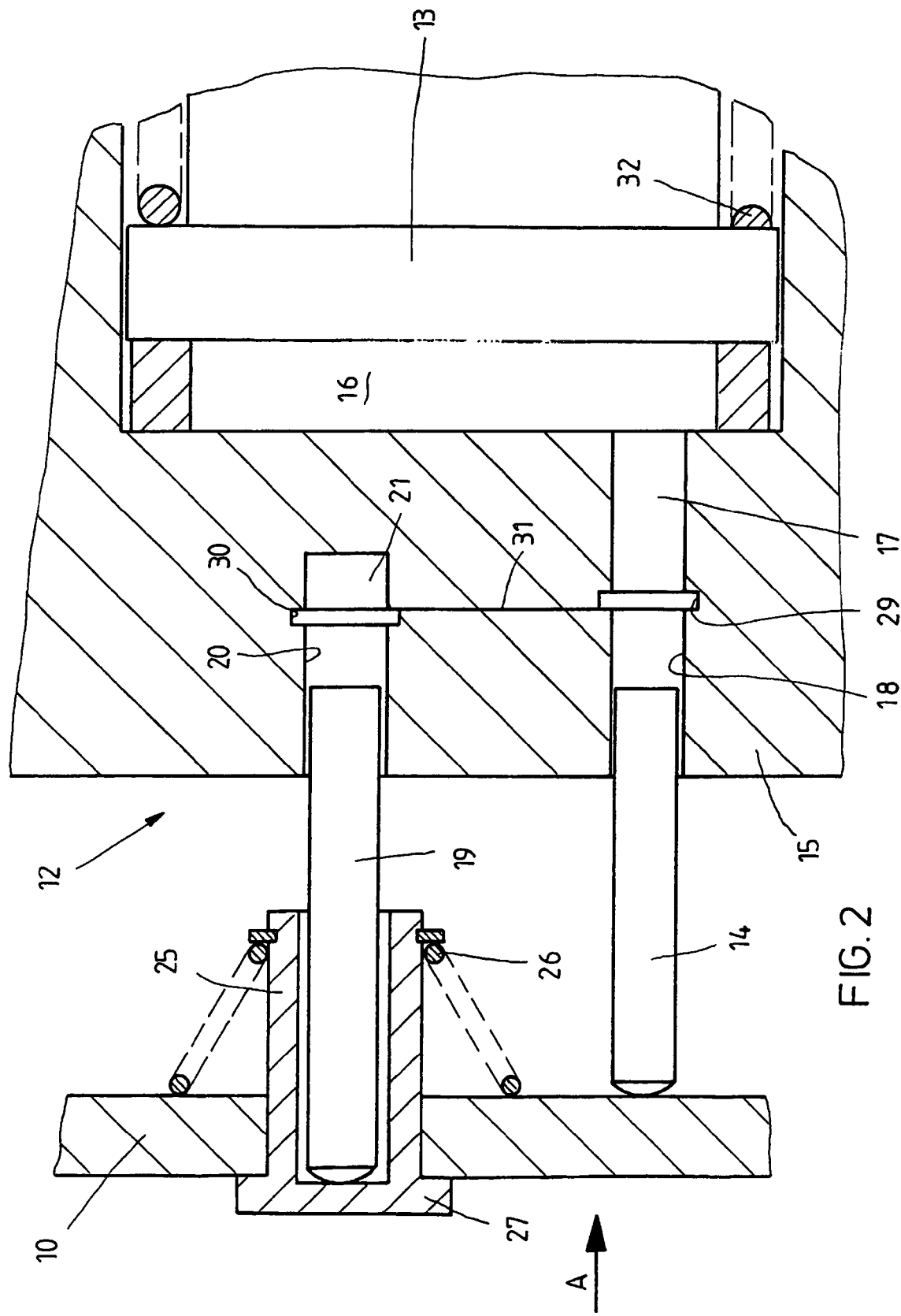
FIG. 2 shows a second exemplary embodiment, in which there is likewise a second small piston, which follows the entire movement of the drive element and, after reaching the specific, forces the pressure fluid into a storage chamber.

According to FIGS. 1 and 2, a drive plate 10 can be made to move in opposite directions as a drive element, in a way not represented in any more detail, by an electric motor via a spindle drive. A hydraulic force multiplier 12 has, as principal parts, a large piston 13 and one or more first small pistons 14 and also an intermediate part 15, which together with the pistons encloses a pressure chamber 16. This pressure chamber comprises on the one hand the subchamber which is located between the large piston 13 and the bottom of the cavity receiving the large piston and on the other hand a subchamber 17 in a continuous bore 18 of the intermediate part, which is entered in a sealed manner by the small piston 14 as a plunger piston and which opens out into the cavity for the large piston 13. The small piston 14 bears against the drive element 10 with a convexly curved end face.

The force multiplier 12 also comprises one or more second small pistons 19. The diameter of the second small piston is greater than the diameter of the first second piston. The second small piston is also a plunger piston, which however, unlike the first small piston, does not enter a continuous bore in a sealed manner with its one end, but enters a blind bore 20 of the intermediate part and delimits a fluid chamber 21 in said blind bore. With its other end, the second small piston enters with lateral play a bushing 25, against the bottom of which it bears with a convexly curved end face. On account of the curved end face against the small piston, compensation of alignment errors between the small piston and the drive plate 10 is possible.

The bushing 25 is fitted in a longitudinally movable manner into a bore of the drive plate 10. A compression spring 26, which is arranged with a certain biasing between the drive plate and the bushing, attempts to keep a flange 27 of the bushing against the drive plate.

In the case of the exemplary embodiment according to FIG. 1, the pressure chamber 16 and the fluid chamber 20 can be connected to one another and can be shut off from one another using an electromagnetically operable 2/2-way directional control seat valve 28, which is inserted directly between the fluid chamber 21 and the cavity receiving the large piston 13.

In the case of the exemplary embodiment according to FIG. 2, the 2/2-way directional control seat valve is substituted by a controller with a first small piston 14. Around the bore 18 there extends an annular groove 29 and around the bore 20 there extends an annular groove 30, which is connected to the annular groove 29 via a channel 31. The piston 14 covers over the annular groove 29 when it has entered far enough into the bore 18. Similarly, the piston 19 covers over the annular groove 30 when it has entered far enough into the bore 20. The covering of the annular groove 30 by the piston 19 ends the first phase and begins the second phase of the pressure build-up in the pressure chamber 16. This covering is rather more likely to take place than the covering of the annular groove 29 by the piston 14, so that during phase two of the pressure build-up in the pressure chamber 16 this pressure chamber is sealed off from the fluid chamber 21 both by the piston 14 and by the piston 19.

Clamped between the large piston 13 and the intermediate part 15 is a helical compression spring 32, which is able during the return of the closing unit to hold the large piston together with the movable part of the mold against the bottom of the pressure chamber 16, and consequently against the intermediate part.

The drive plate 10 and the intermediate part 15 can be releasably connected to one another in a way not represented in any more detail by means of a coupling which can be operated for example electromagnetically. Likewise not represented in any more detail in FIGS. 1 and 2, there is furthermore a blocking device, with the aid of which the intermediate part 15 can be fixed with respect to the machine frame at the end of the positioning movement, in order to allow the force multiplication to take effect.

In FIGS. 1 and 2, the drive device is assumed to be shown in a state in which the mold of a plastics injection molding machine is completely open. The large piston 13 bears against the intermediate part 15 under the action of the helical spring 32. The small pistons 14 and 19 have entered the bores 18 and 20 by the least amount. In the case of the exemplary embodiment according to FIG. 1, the valve 28 is open; in the case of the exemplary embodiment according to FIG. 2, the annular grooves 29 and 30 are not covered over, so that the fluid chamber 21 is open toward the pressure chamber 16.

For closing the mold, the coupling between the drive plate 10 and the intermediate part 15 of the force multiplier 12 is closed. The blocking device between the intermediate part 15 and the machine frame is deactivated. The electric motor, not represented in any more detail, is then activated in such a way that its rotor turns in a direction by which the drive plate 10 is moved in the direction of the arrow A by means of the spindle drive. The small pistons 14 and 19 are taken along by the drive plate. By means of the closed coupling, the intermediate part 15 and the large piston 13 are also taken along by the drive plate, so that the parts of the force multiplier 12 are not moved counter to one another. As an alternative to a closed coupling, the drive plate may also take along the large piston 13 and the intermediate part by means of the pressure fluid buffer in the chambers 16 and 21. If there is sufficiently high preloading pressure, the large piston 36 directly follows the movement of the small pistons 14 and 19 and also takes along the intermediate part 15 via the helical compression spring 32.

Finally, the mold is closed, so that there is great resistance to further movement of the large piston 13. The possibly closed coupling between the drive plate 10 and the intermediate part 15 is released. The intermediate part 15 is blocked in the position reached. The drive plate 10 is moved further, so that the small pistons 14 and 19 further enter the bores 18 and 20 and reduce the size of the subchamber 17 and the fluid chamber 21. Pressure fluid is forced out of the fluid chamber 21 via the channel 31 into the subchamber 17, and consequently into the pressure chamber 16. The overall volume of the pressure chamber 16 and of the fluid chamber 21 is quickly reduced, so that the pressure in the pressure chamber 16 rapidly rises in a first phase of the pressure build-up. In the case of the exemplary embodiment according to FIG. 1, the valve 28 is brought into its closing position when a specific pressure, for example a pressure of 50 bar, is reached in the pressure chamber 16. In the case of the exemplary embodiment according to FIG. 2, the second small piston 19 covers over the annular groove 30 after a specific displacement, after which for example a pressure of 50 bar is reached in the chambers 16 and 21. Against the pressure of 50 bar, the spring 26 is still able to hold the bushing 25 in contact with the drive plate 10. In the second phase of the pressure build-up now beginning, pressure fluid is no longer forced out of the fluid chamber 21 into the pressure chamber 16. The further rise in pressure is brought about solely by the first small piston, moved further by the drive plate 10. The pressure in the fluid chamber 21 rises up to the pressure equivalent to the force of the biased compression spring, lying slightly above the specific pressure of, for example, 50 bar. After that, the bushing 25 lifts off from the drive plate 10, with the stress of the compression spring 26 and the pressure in the fluid chamber 21 increasing in a way corresponding to the characteristic of the compression spring 26. At the end of the second phase of the pressure build-up in the pressure chamber 16, the mold is kept closed by a great closing force, which is obtained from the product of the pressure in the pressure chamber 16 and the effective surface area of the large piston 13 less the force of the helical compression spring 32. The force of reaction on the spindle drive, on the other hand, is determined by the product of the pressure in the pressure chamber 16 and the significantly smaller effective surface area of the first small piston 14 and also by the force exerted by the compression spring 26, that is to say is significantly less than the closing force.

For opening the mold, the electric motor is driven in the opposite direction. The drive plate moves to the left, counter to the direction of the arrow A. It is followed by the first small piston 14, so that the pressure in the pressure chamber 16 decreases. After a first phase of the pressure reduction, which corresponds to the second phase of the pressure build-up, the fluid chamber 21 is opened again with respect to the compression chamber 16. After a second phase of the pressure reduction, which corresponds to the first phase of the pressure build-up, the coupling between the drive plate 10 and the intermediate part 15 of the hydraulic force multiplier 12 is closed; the blocking of the intermediate part is discontinued. Then, the hydraulic force multiplier as a whole is brought back into a position corresponding to the opened closing unit.

Figure 3:
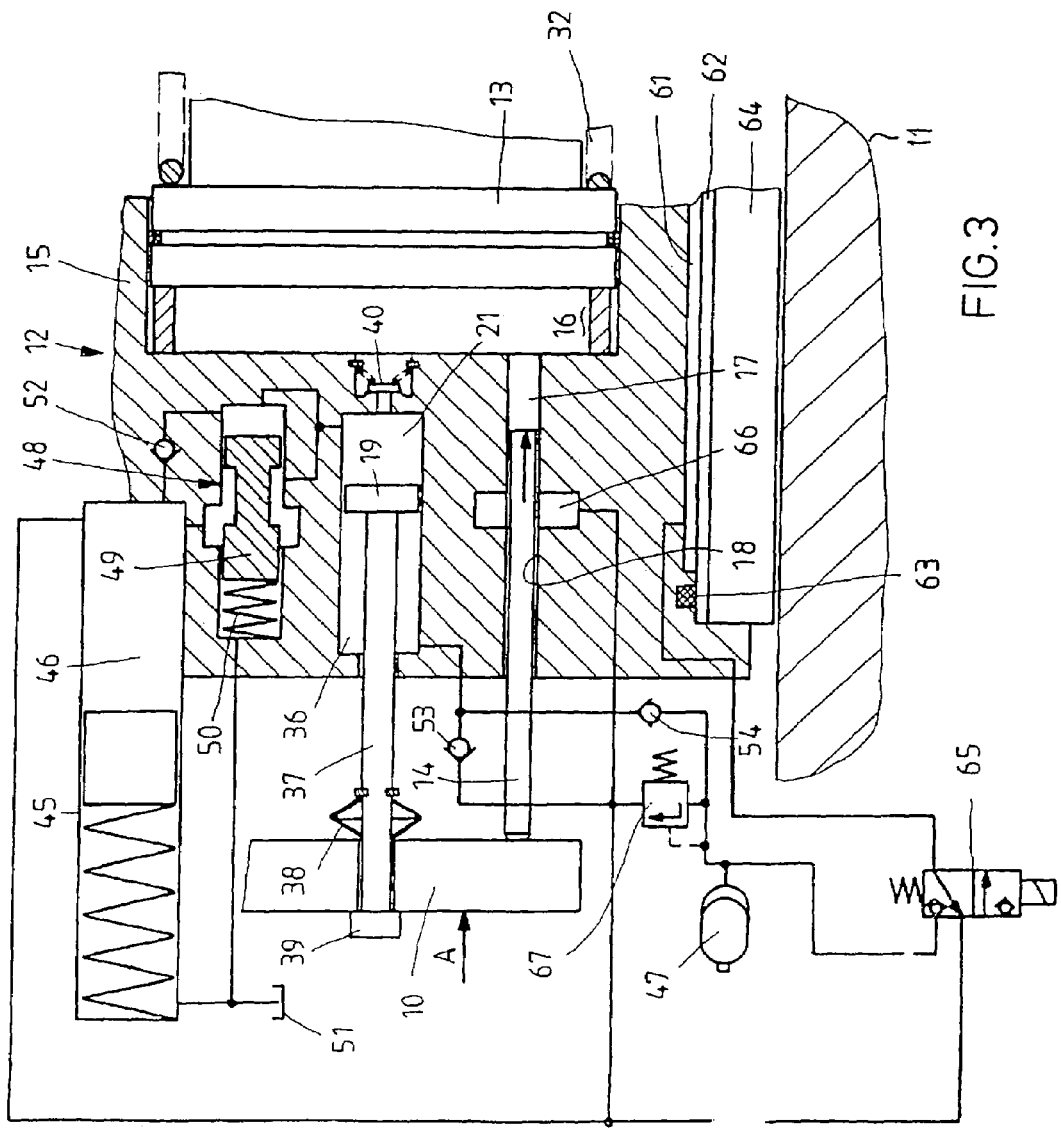
FIG. 3 shows a third exemplary embodiment, in which the blocking device is a magnetic-particle clutch.

In the case of the exemplary embodiment according to FIG. 3, the first small piston 14 is a simple plunger piston, which enters a bore 18 of the intermediate part 15. The second small piston 19 is then formed in a double-acting manner. Lying opposite the fluid chamber 21 with respect to the piston 19 there is a second, annular fluid chamber 36, which is crossed by a piston rod 37, by means of which the piston 19 can be moved by the drive plate 10. To be precise, the piston rod 37 can be taken along in the sense of reducing the size of the fluid chamber 21 by means of a spring arrangement 38 comprising a number of cup springs and can be taken along in the opposite direction by means of a flange 39, which is held against the drive plate 10 by the spring arrangement 38.

Arranged between the fluid chamber 21 and the pressure chamber 16 is a non-return valve 40, which blocks the pressure chamber 16 with respect to the fluid chamber 21.

Also fastened to the intermediate part 50 is a hydraulic accumulator 45, which is formed as a piston accumulator and in the storage chamber 46 of which a pressure in the range of 20 bar is assumed to prevail, and a hydraulic accumulator 47, which is charged to a very much higher pressure in the range between 100 and 200 bar. Pressure fluid can flow out of the fluid chamber 21 into the storage chamber 46 via a pressure sequence valve 48. The slide 49 of the pressure limiting valve is acted on in the opening direction by the pressure prevailing in the fluid chamber 21 and in the closing direction by a compression spring 50, which is located in a spring chamber connected just like the spring chamber of the hydraulic accumulator 45 to a tank 51. Parallel to the valve 48 there lies between the fluid chamber and the storage chamber 46 a non-return valve 52, which shuts off from the fluid chamber 21 toward the storage chamber 46.

Pressure fluid can flow in from the storage chamber 46 via an inlet valve 53 formed as a non-return valve. Pressure fluid can be forced out of the fluid chamber 36 into the hydraulic accumulator 47 via an outlet valve 54, likewise formed as a non-return valve. The second small piston 19 is consequently also effective as a working piston of a plunger pump, with which pressure fluid is sucked in from the hydraulic accumulator 45 and discharged into the hydraulic accumulator 47. As a result, the latter can be kept at a high pressure level.

Pressure fluid from the hydraulic accumulator 47 is used to actuate the blocking device 60, with which the intermediate part 15 can be blocked with respect to the machine frame. The blocking device 60 comprises a thin-walled tube 62, which surrounds the intermediate part 15 with the formation of a peripheral clearance 61 and at the ends of which the clearance is sealed off by seals 63. The tube 62 is surrounded on the outside by a plurality of individual braking bars 64, which combine to form a closed ring when they rest on the relaxed tube 62 and which are held on the intermediate part axially with slight play, which ensures their freedom of movement in the radial direction. Each braking bar 64 may be provided on the outside with a friction lining. In the relaxed state of the tube 62, the braking bars are at a distance from a wall of the machine frame, which in FIG. 3 is provided with the reference numeral 11. The clearance 61 is connected to a 3/2-way directional control seat valve 65 and in one position is connected to the hydraulic unit 45 and in the other position is connected to the hydraulic accumulator 47.

As in the case of the exemplary embodiment according to FIG. 2, the first small piston 14 is also used for controlling a flow cross section for pressure fluid in the case of the exemplary embodiment according to FIG. 3. For this purpose, the bore 18 is provided with a peripheral groove 66, which is fluidically connected to the hydraulic motor 46. The annular groove 66 is located at such a point of the bore 18 that the piston 14 has opened a flow cross section between the pressure chamber 16 and the storage chamber 46 during the positioning movements.

With the closing unit of a plastics injection molding machine fully opened, the drive plate is significantly further away from the intermediate part than is shown in FIG. 3. The piston 14 has entered less far into the bore 18, so that the pressure chamber 16 is fluidically connected to the storage chamber 46. In the view according to FIG. 3, the piston 19 is further to the left. The valve 48 is closed. The same pressure prevails in the pressure chamber 16 and in the fluid chamber 21 as in the storage chamber 46. If the mold is then to be closed, the drive plate 10 is moved to the right in the direction of the arrow A and takes along the pistons 14 and 19. By means of the pressure fluid buffer in the pressure chamber 16 and in the fluid chamber 21, under a preloading pressure of approximately 20 bar, and also by means of the helical compression spring 32, the large piston 13 and the intermediate part 15 of the hydraulic unit 12 are also taken along, without a relative movement between the pistons 14 and 19 and the intermediate part 15 taking place.

Once the mold is finally closed, there is a high resistance to further movement of the large piston 13. The valve 65 is brought into a different position according to FIG. 3, and consequently the free chamber 61 is connected to the hydraulic accumulator 47 and, as a result, is subjected to high pressure. The tube 62 expands, so that the braking bars are deployed outward against the machine frame 11. As a result, the intermediate part 15 is blocked by clamping with respect to the machine frame. The pistons 14 and 19 move further in relation to the intermediate part. The piston 14 closes the flow cross section at the annular groove 66 and forces pressure fluid out of the subchamber 17. The piston 19 forces pressure fluid out of the fluid chamber 21 via the non-return valve 40 into the pressure chamber 16. In this first phase of the pressure build-up in the pressure chamber 16, the pressure rises very rapidly with the displacement of the pistons 14 and 19, until for example 50 bar is reached. When there is a pressure of 50 bar in the fluid chamber 21, the valve 48 opens and the second phase of the pressure build-up begins. Unlike in the case of the exemplary embodiments according to FIGS. 1 and 2, the second small piston 19 is also moved further by the drive plate 10 during the second phase of the pressure build-up. In this case, the piston 19 forces pressure fluid out of the fluid chamber 21 via the valve 48 into the storage chamber 46. The non-return valve 40 closes when the valve 48 opens. Now, only the movement of the small piston 14 contributes to the pressure build-up in the pressure chamber 16. The fluid chamber 36 located on the piston rod side of the piston 19 is replenished with pressure fluid from the storage chamber 46 via the non-return valve 53. The amount of pressure fluid in the storage chamber 46 consequently increases by the volume of the subsequently advancing piston rod 37.

For opening the mold, the electric motor, not shown here, is driven in the opposite direction of rotation, so that the drive plate moves counter to the direction of the arrow A. The pistons 14 and 19 follow, the pressure in the fluid chamber 21 rapidly dropping and the valve 48 closing. The fluid chamber can be replenished with pressure fluid from the storage chamber 46 via the non-return valve 52. During the pressure reduction, it is no longer possible to distinguish between two phases, since the non-return valve 40 remains closed up to the beginning of the second pressure build-up phase in the next working cycle. When the piston 14 has reached the same position as at the beginning of the first phase of the pressure build-up, it opens a flow cross section between the subchamber 17 and the annular groove 66, so that the amount of pressure fluid forced via the non-return valve 40 into the pressure chamber 16 by the piston 19 during the first pressure build-up phase can flow back into the storage chamber 46 and the same pressures again prevail in the chambers 16, 21 and 46.

The piston rod 37 has such a diameter that slightly more pressure fluid is forced via the non-return valve 54 during the pressure reduction phase than was previously removed from the hydraulic accumulator for the actuation of the blocking device. Excessive pressure fluid supplied flows away to the storage chamber 46 via a pressure limiting valve 67.

At the end of the pressure reduction phase, the valve 65 is switched over and, as a result, the clearance 61 is connected to the storage chamber 46 and relieved to the pressure of the latter. The pressure in the fluid chamber 36 drops to a pressure necessary for moving the closing unit in the opening direction. Thereafter, the intermediate part 15 can be moved by the drive plate in the opening direction by means of the pressure fluid buffer in the fluid chamber 36 and by means of the piston 19 and the piston rod 37. If the cross-sectional area of the fluid chamber happens to be too small, a clutch may be provided between the drive plate 10 and the intermediate part 15.

Figure 4:
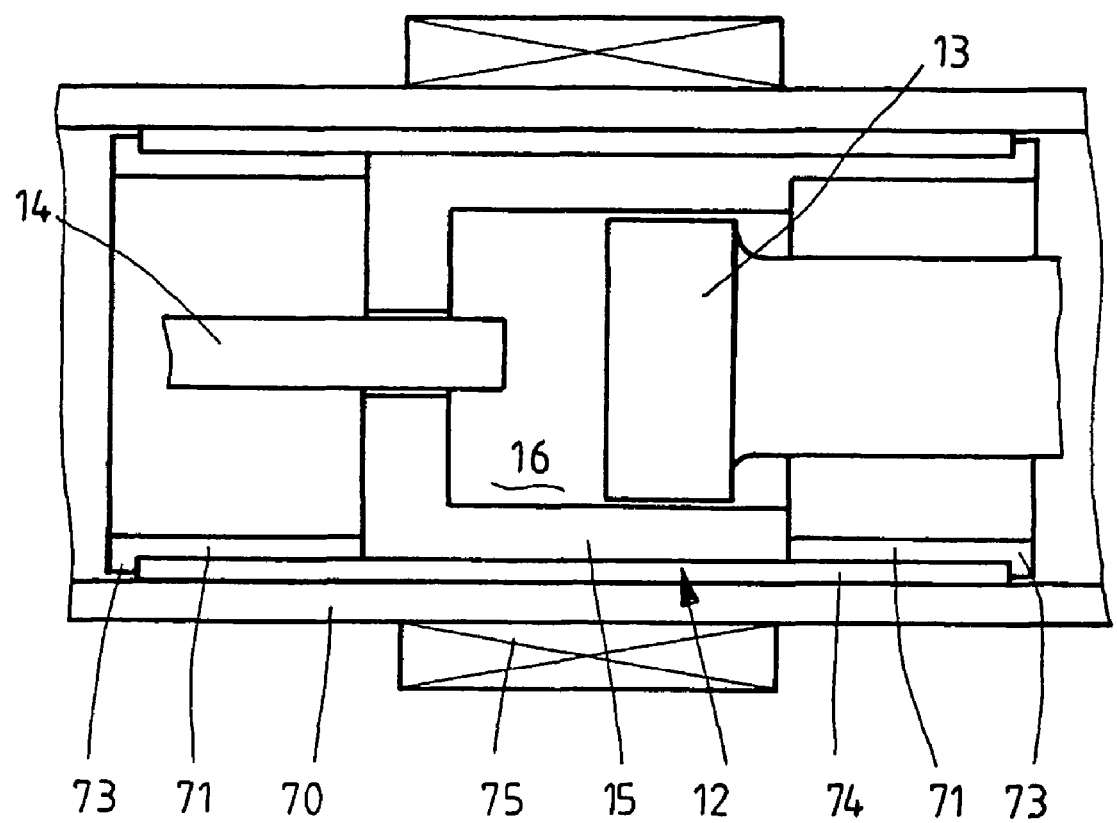
FIG. 4 shows a fourth exemplary embodiment.

In the case of the exemplary embodiment according to FIG. 4, in a tube 70 of a machine frame there is a hydraulic force multiplier with a small piston 14, a large piston 13 and a bushing-like intermediate part 15. These parts enclose a pressure chamber 16. The outside diameter of the intermediate part 15 is less than the inside diameter of the tube 70. Furthermore, attached to both end faces of the intermediate part 15 are skirts 71, which are guided with outer flanges 73 in the tube 70 at their end that this remote from the intermediate part 15 and consequently also guide the intermediate part 15. In front of the flanges, the skirts have the same outside diameter as the intermediate part 15. In the annular chamber 74 extending axially between the flanges 73 there is a powder of magnetizable particles. The tube 70 is surrounded by a magnetic coil 75, which is arranged at such a point that, after an infeeding movement of the hydraulic unit 12, the annular chamber 74 is in the region of the magnetic coil. If a current is then sent through the magnetic coil, the magnetic particles align themselves along the field lines and couple the intermediate part 15 and the tube 70 to one another, so that the intermediate part is blocked with respect to the machine frame.

Magnetic-particle clutches are known per se, so that it is not necessary to discuss them in any more detail here.

What is claimed is:

1. A drive device, in particular for a closing unit, injection unit or ejectors of a plastics injection molding machine, the drive device comprising a drive element (10) which is axially moveable, and a hydraulic unit (12) which, by movement of the drive element (10), is moveable in same direction as the drive element, wherein the hydraulic unit (12) is a force multiplier comprising an intermediate part (15), and a large piston (13) and a first small piston (14) which are moveable within the intermediate part and which pistons are movable in relation to one another and differ from one another in size of their effective surface areas, wherein the intermediate part (15) together with the pistons enclose a pressure chamber (16) filled with a pressure fluid, the first small piston (14) has a smaller effective surface area than the large piston, and is mechanically connected to the drive element (10), wherein the hydraulic unit (12) as a whole is moveable for a positioning movement, and wherein, for exertion of a great force by the large piston (13), the intermediate part (15) can be blocked against displacement in relation to a fixed frame (11) by a blocking device during a force build-up movement of the drive element (10), and wherein the hydraulic unit (12) further comprises a second small piston (19) moveable within the intermediate part (15) and a fluid chamber (21) which is disposed in the intermediate part (15) and is adjoined by the second small piston; and wherein, arranged between the fluid chamber (21) and the pressure chamber (16) is a valve (28, 40), via which valve pressure fluid is forceable out of the fluid chamber (21) into the pressure chamber (16), and by which valve the fluid chamber (21) is shutable off with respect to the pressure chamber (16).

2. The drive device as claimed in claim 1, wherein the valve (40) is a non-return valve opening toward the pressure chamber (16).

3. The drive device as claimed in claim 1, wherein the second small piston (19) is moveable along by the drive element (10) by a releasable coupling device.

4. The drive device as claimed in claim 3, wherein the coupling device has a biased spring arrangement (26, 38), by means of which a movement of the drive element (10) is transmitable to the second small piston (19).

5. The drive device as claimed in claim 1, wherein the fluid chamber (21) and a storage chamber (46) for pressure fluid are connectable to one another via a second valve (48), wherein after opening of the second valve (48) pressure fluid can be forced out of the pressure chamber (21) into the storage chamber (46) by the second small piston (19), taken along further by the drive element (10) engaged in a force build-up movement.

6. The drive device as claimed in claim 5, wherein the second valve (48) is acted on by pressure in the fluid chamber (21) in the opening direction against force of an energy store (50).

7. The drive device as claimed in claim 1, wherein a non-return valve (52) is arranged parallel to the second valve (48), between the fluid chamber (21) and the storage chamber (46), said non-return valve (52) opens toward the fluid chamber (21).

8. The drive device as claimed in claim 5, wherein the pressure chamber (16) is connectable to the storage chamber (46) toward the end of force reducing movement.

9. The drive device as claimed in claim 8, wherein in a specific position with respect to the intermediate part (15), the first small piston (14) opens a flow cross section between the pressure chamber (16) and the storage chamber (46).

10. The drive device as claimed in claim 5, wherein on a side of the second small piston (19) opposite from the fluid chamber (21) there is a second fluid chamber (36) in which pressure fluid is confinable, so that the hydraulic unit (12) is moveable along by the drive element (10) on its return by means of confined pressure fluid.

11. The drive device as claimed in claim 10, wherein the second fluid chamber (36) is connectable via an inlet valve (53) to the storage chamber (46) and via an outlet valve (54) to a high-pressure accumulator (47).

12. The drive device as claimed in claim 11, wherein the blocking device can be hydraulically operated and wherein a working chamber (61) of the blocking device is connected to the high-pressure accumulator (47) in one position of a valve (65) and is connected to the storage chamber (46) in another position of said valve (65).

13. The drive device as claimed in claim 10, wherein the second fluid chamber (36) is smaller in cross section than the first-mentioned fluid chamber (21) by a piston rod (37) crossing it and serving for connection between the second small piston (19) and the drive element (10).

14. The drive device as claimed in claim 1, wherein the blocking device is a magnetic-particle clutch.

* * * * *